United States Patent [19]

Armstrong

[11] Patent Number: 5,014,858

[45] Date of Patent: May 14, 1991

[54] REFUSE SEPARATOR

[76] Inventor: Ernest T. Armstrong, 810 Fukuoka-shi, Chuo-ku, Jonai 9-10, Japan

[21] Appl. No.: 495,735

[22] Filed: Mar. 19, 1990

[51] Int. Cl.[5] .............................................. B07B 13/10
[52] U.S. Cl. ..................................... 209/641; 209/638; 209/707; 209/930
[58] Field of Search .............. 209/509, 522, 606, 638, 209/641, 645, 700, 702, 706, 707, 908, 911, 924, 930, 933, 374, 375; 211/10; 220/1 T, 23.2, 23.4, 23.83, 23.86, 404; 232/43.1, 43.2, 43.5; 298/907; 312/210.5, 211, 212; 414/293, 299

[56] References Cited

U.S. PATENT DOCUMENTS

| | | | |
|---|---|---|---|
| 75,043 | 3/1868 | Morrison | 209/374 |
| 239,994 | 4/1881 | Truax | 209/638 |
| 565,577 | 8/1896 | Stanley | 209/638 X |
| 719,343 | 1/1903 | Langerfeld . | |
| 753,591 | 3/1904 | Langerfeld | 209/638 |
| 753,592 | 3/1904 | Langerfeld | 209/638 |
| 977,956 | 12/1910 | Langerfeld . | |
| 1,005,428 | 10/1911 | Hobart | 209/641 |
| 1,353,856 | 9/1920 | Schlunke | 209/638 |
| 1,421,809 | 7/1922 | Mischke | 209/374 |
| 1,525,116 | 2/1925 | Buel | 209/638 X |
| 1,648,716 | 11/1927 | Berrisford | 209/638 |
| 1,787,096 | 12/1930 | Tarone et al. | 209/641 |
| 3,356,213 | 12/1967 | Weber | 209/638 |
| 3,738,483 | 6/1973 | MacKenzie | 209/638 X |
| 3,805,953 | 4/1974 | Jones et al. | 209/638 |
| 4,114,776 | 9/1978 | Pluss | 220/1 T X |
| 4,801,034 | 1/1989 | Sandomeno | 220/23.83 |
| 4,834,262 | 5/1989 | Reed | 220/404 |
| 4,874,111 | 10/1989 | Heller | 220/404 |
| 4,878,592 | 11/1989 | Lee | 220/1 T X |

FOREIGN PATENT DOCUMENTS

| | | | |
|---|---|---|---|
| WO89/02320 | 3/1989 | European Pat. Off. | 209/707 |
| 2928886 | 1/1980 | Fed. Rep. of Germany | 209/930 |
| 3710335 | 10/1988 | Fed. Rep. of Germany | 209/638 |
| 64-2901 | 1/1989 | Japan | 220/1 T |
| 1237581 | 6/1986 | U.S.S.R. | 209/645 |

Primary Examiner—Margaret A. Focarino
Assistant Examiner—Edward M. Wacyra

[57] ABSTRACT

A trash separator that sorts bottles and cans from other, non-recyclable refuse. This separator consists of a slide 4 with an inlet 1 for all refuse at the top and an outlet 3 for the refuse at the bottom. The refuse is separated because the size and weight of the bottles and the cans is such that they attain a higher velocity sliding down the slide than the other refuse. These faster moving bottles and cans are sent on a trajectory that lands them in a far receptacle 7 while the remainder of the refuse, which is slower moving, falls into the receptacle 8 that is closest to the terminal end of the slide. The apparatus is a molded plastic cover that sits atop the receptacles and can easily fit in the kitchen, garage, office or on a street corner. It is designed to make recycling more convenient, sanitary and enjoyable.

11 Claims, 5 Drawing Sheets

REFUSE SEPARATOR

BACKGROUND—FIELD OF THE INVENTION

This invention is a lid for trash receptacles with an opening in it into which refuse is discarded. The recyclable bottles and cans fall into one receptacle, while the non-recyclable materials fall into a separate receptacle.

Many types of home or office waste, such as bottles, paper, cans, liquids, plastic, or food-scraps, can be discarded into the opening of a chute or slide protruding from the cover of the trash can. Non-recyclable refuse drops slowly into the receptacle nearest the outlet of the slide. The bottles and cans i.e. the recyclable materials slide quickly down the slide and are jettisoned on a trajectory that lands them in a far receptacle. The bottles and cans may be easily carried away to be recycled.

The final object of this invenion is to increase amount of bottles and cans recycled by rendering the separation more convenient.

The invention will be described in connection with, but without any intended limitation to, this particular application.

BACKGROUND—DISCUSSION OF PRIOR ART

Heretofore, recyclable refuse from the home, office, or street has been separated manually, by placing the refuse in separate recipients, such as bags or containers. People wishing not to trouble themseleves with picking used bottles or cans out of full trash cans have often chosen to skip recycling, a situation which has added extra volume to our landfills and has necessitated the use of new resources and energy to replace the products.

The inventors of other compartmentalized trash separation receptacles [M. Reed, U.S. Pat. No. 4,834,262 (1989), N. Lee, U.S. Pat. No. 4,878,592 (1989), L. Sandomeno, U.S. Pat. No. 4,801,034 (1989) and E. Pluss, U.S. Pat. No. 4114,776 (1978)] have heretofore not addressed the problem of how to separate the recyclable materials from the non-recyclable materials, i.e. their inventions have relied on the diligence of the users to make the effort to separate the refuse.

The current invention improves upon the above prior art in that it simplifiers the task of separation of most recyclable materials from non-recyclable materials. The current invention also provides users of all ages with handy, portable storage receptacles.

The current invention differs substantially from each of the prior art separators developed to segregate materials by the use of a slide that shoots the materials to plural destinations. In each case, the current invention constitutes one or more improvements.

The apparatus for separating mixtures of solid particles invented by G. Weber, U.S. Pat. No. 3,356,213 (1965), relates exclusively to separating hot particle size mixtures discharged from rotary kilns, a situation requiring heavy insulation. Weber's separator requires a stepped bottom for loosening the mixture of particles and for initial separation as described in Claim 1, and a separating chute of 150-300 centimeters as described in Claim 2. The current invention can separate using only one slide i.e. not needing a stepped bottom or several slides. The current invention can separate liquids as well as solids, and has a shorter slide than prior art. The preferred embodiment of this invention is simply a cover that fits over the receptacles, or provides a frame for them.

A. Langerfeld has a separator, U.S. Pat. No. 719,343 (1903), with a slide having an inclined frictional differentiating-surface that separates mixed quantities of lump materials. Langerfeld's invention is a slide, not a lid or cover, and is used to separate coal from slate. His process requires first the passing of coal through screens and graded according to size. The current invention requires no pre-screening or pre-grading.

W. Jones' separator, U.S. Pat. No. 3,805,953 (1974), sits atop a tower, has an loading conveyor and has troughs that need to be periodically or continuously lubricated by spraying a silicone lubricant onto the troughs (col. 2, line 4).

One can see form studying the disadvantages listed below of the prior art that the current invention offers numerous improvements.

Apparatuses heretofore known using slides to separate suffered from a number of disadvantages including:

(a) They were structures that were not self-contained, having either open slides or being dependent on other machinery.

(b) Their designs were for industrial, i.e. mining or agricultural usages, not for home or office use.

(c) Their usage required some type of pre-sorting or initial separating.

(d) Their size was too large for home use, they typically had slide lengths that would have been too cumbersome in a kitchen, garage or office.

(e) Their structures were complicated, often requiring elaborate feeding mechanisms.

(f) Because they are complicated, they were expensive.

(g) Many required lubricants.

(h) The structures were not designed to handle bottles, which probably would have shattered in theirs.

(i) They were not simple, molded plastic.

(j) They were not covers or lids.

OBJECTS OF THE INVENTION

Accordingly, several objects and advantages of the present invention are:

(a) to increase the volume of bottles and cans recycled;

(b) to decrease the volume of bottles and cans deposited in land-fills which can pollute the water and soil;

(c) to decrease the volume of bottles and cans placed in large, hig temperature refuse burning furnaces which pollute the air;

(d) to provide a means of recycling that is cleaner and more sanitary than picking the used bottles and cans out of full trash cans;

(e) to save the user's time by providing a convenient way to separate trash;

(f) to provide the users a means of income, i.e. they can receive a redemption payment at the recycling center;

(g) to give the user handy, portable receptacles that can be used to carry the sorted recyclable materials to the recycling center or to the curb-side for pickup;

(h) to provide a lightweight, portable receptacle(s) for the transport of recyclable materials; and (i) to provide the user a place to store recyclable materials and nonrecyclable materials.

Further objects and advantages of my invention will become apparent from a consideration of description and drawings which follow.

DESCRIPTION OF DRAWINGS

In the drawings, closely related figures have the same number but different alphabetical suffixes.

DESCRIPTION OF INVENTION

Figure 1A:
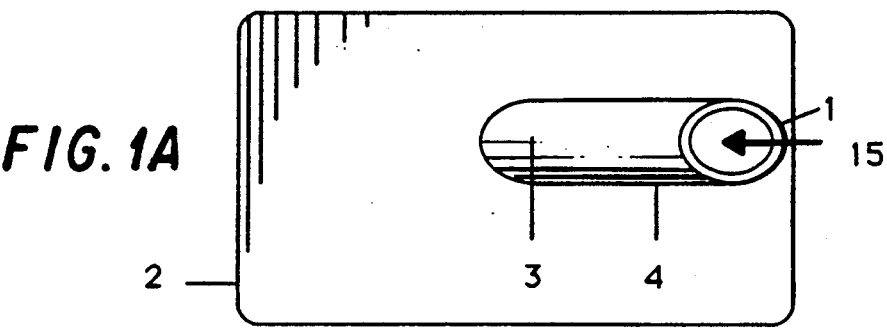
FIG. 1A is a top view of the cover, showing a refuse inlet 1 and slide 4. Arrow 15 indicates the input of the refuse.

A preferred embodiment of the trash separator cover is illustrated in FIG. 1A, a top view. The cover 2 illustrated has an inclined chute, or slide 4 into which various types of refuse are placed 1 and an outlet 3 at the bottom from which the refuse is expelled.

The cover can be one piece of molded plastic which fits over the containers or receptacles. The plastic used in the cover and receptacles is typical of plastics used in such trash cans as the trash can called "Roughneck" (Registered Trademark) by Rubbermaid Inc., 1147 Akron Road, Wooster, Ohio 44691 U.S.A.

Figure 1B:
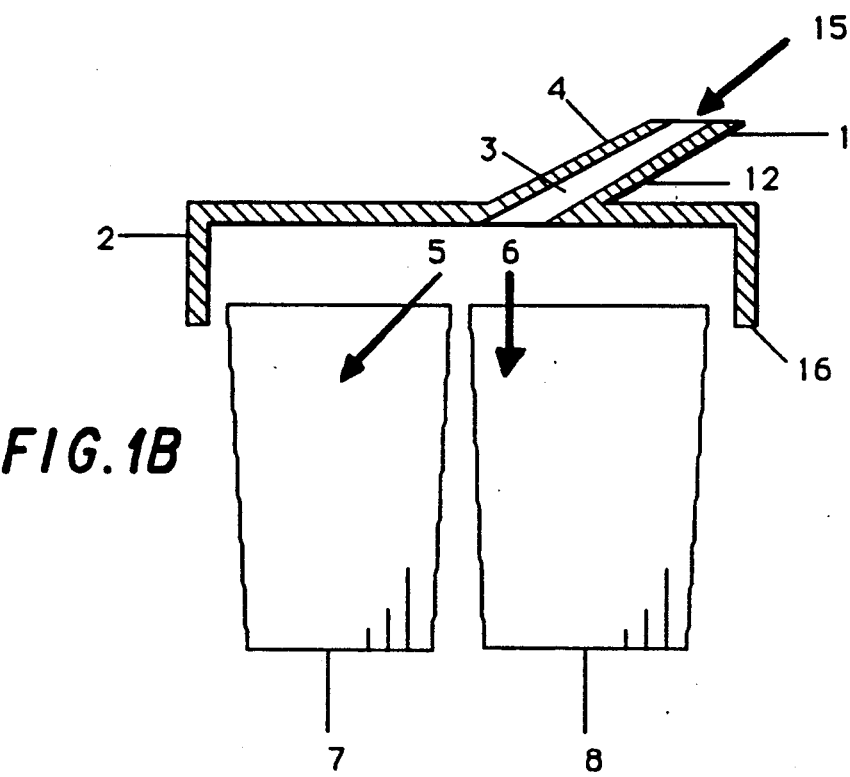
FIG. 1B is a side view of a cross-section of a cover and two receptacles, with arrows indicating trajectories of recyclable materials 5 and nonrecyclable materials 6 jettisoned from a straight slide terminal end 12.
Figure 2:
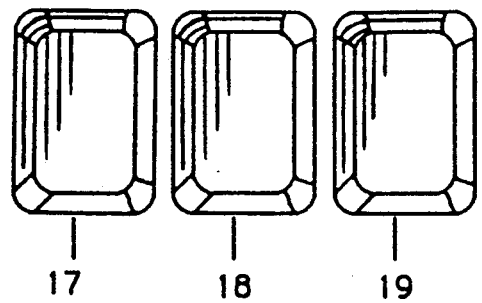
FIG. 2 is a top view of three receptacles pressed against one another 17, 18 and 19.
Figure 3:
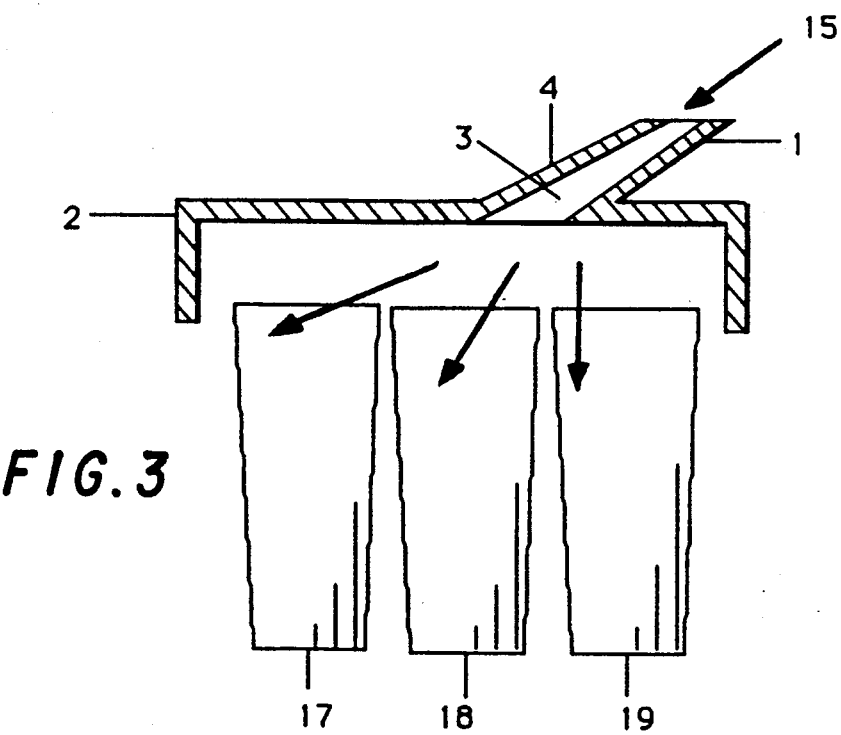
FIG. 3 is a side view of a cross-section of a cover 2 and three receptacles 17, 18 and 19, with arrows indicating trajectories of recyclable materials and non-recyclable materials jettisoned into the receptacles.

This cover sits atop at least two receptacles 7, 8 or 17, 18, 19 into which the separated refuse is jettisoned. These receptacles are rectangular shaped so that they can be placed close to one another. Because of the proximity of where the recyclable bottles and cans fall and where the nonrecyclable trash falls, the receptacles should remain pressed closely together, as seen in FIGS. 2 and 3. Trash is separated by falling on either side of where the receptacles meet, as seen in FIG. 1B.

The receptacles can be held against one another by having the edges 16 of the cover fit snugly over the tops of the receptacles or having supporting legs extend down from the cover forming one continous frame that holds the receptacles in place (not shown). The receptacles can also be adjoined by an interlocking device (not shown). The receptacles may or may not be lined with plastic disposable trash bags or paper bags (not shown).

The slide can be made out of the same material as the rest of the cover, or it can be a separate material, or it can be lined with a special low friction lining to facilitate the sliding of discarded refuse. The interior of the slide can be smooth, rough or ribbed.

The slide should be positioned at an inclination of twenty to fifty degrees from the horizontal plane.

Figure 4A:
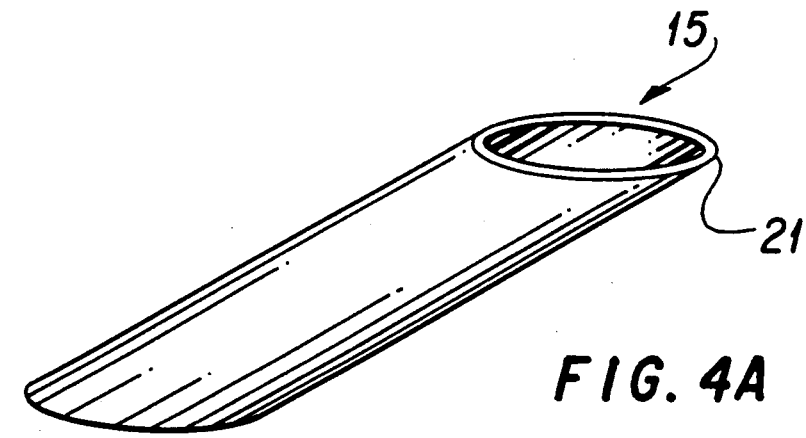
FIGS. 4A, 4B and 4C are respectively drawings of slides with troughs that are round 21, flat 22 and grooved in the shape of an average twelve-once soda can 23.
Figure 4B:
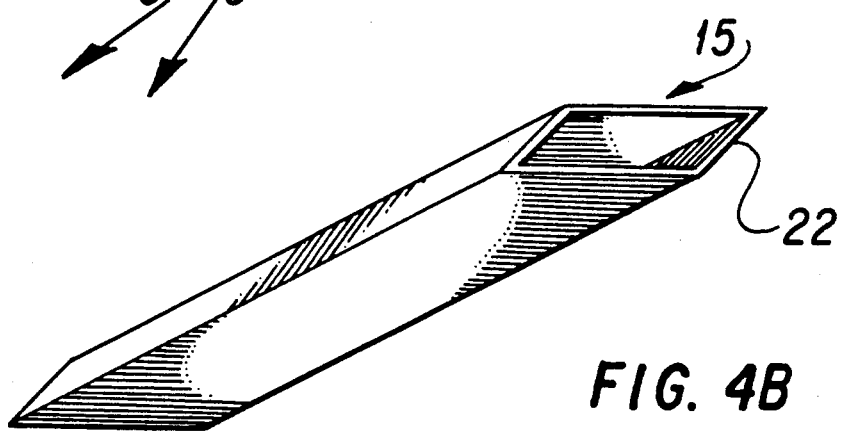
Figure 4C:
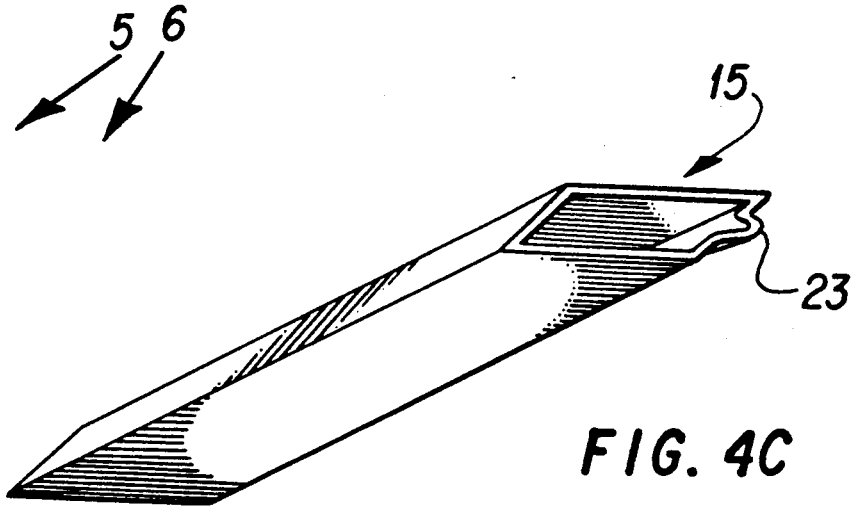
Figure 4D:
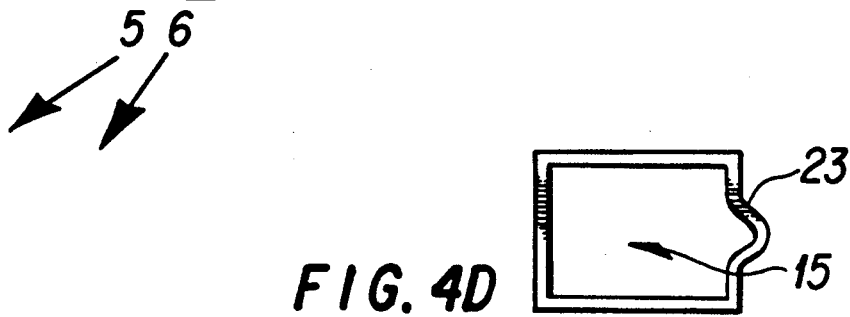
FIG. 4D is a top view of a can-shape grooved slide.

The part of the slide along with the refuse slides is called the trough, and forms the lower surface of the slide. As seen respectively in FIGS. 4A, 4B, and 4C, this trough can have one of several preferred embodiments: curved in which the slide is part of a tube 21, flat-bottomed 22 in which the slide is part of a rectangle, or having a lower surface with a semi-circular groove 23 running along it. This groove is formed to easily accept a typical twelve-once soda can, and allow such a can to slide down inside of the groove.

Figure 6A:
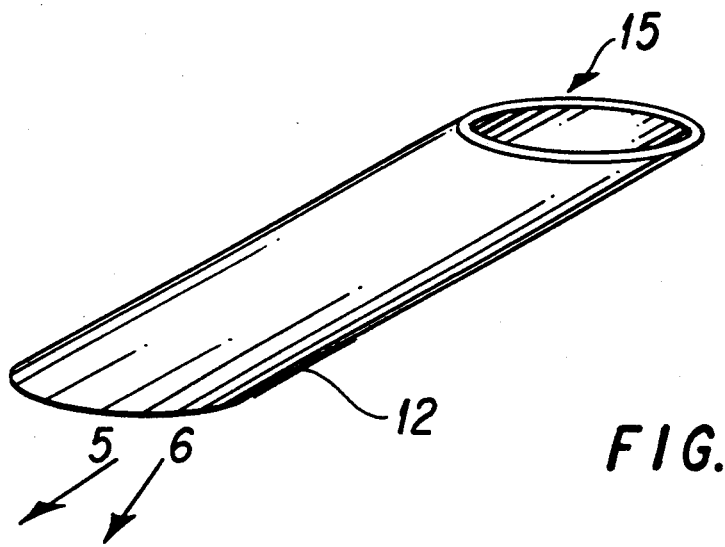
FIGS. 6A, 6B, and 6C are respectively drawings of slides comprising a straight terminal end 12, a ski-jump like terminal end 13 and a hump terminal end 14.
Figure 6B:
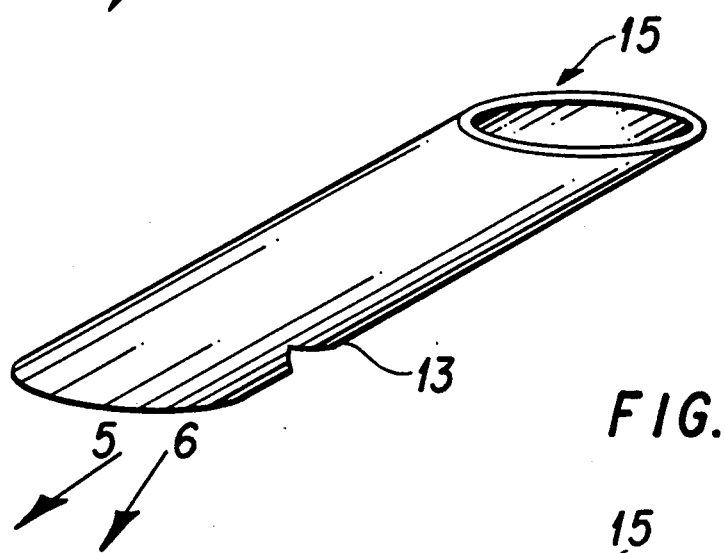
Figure 6C:
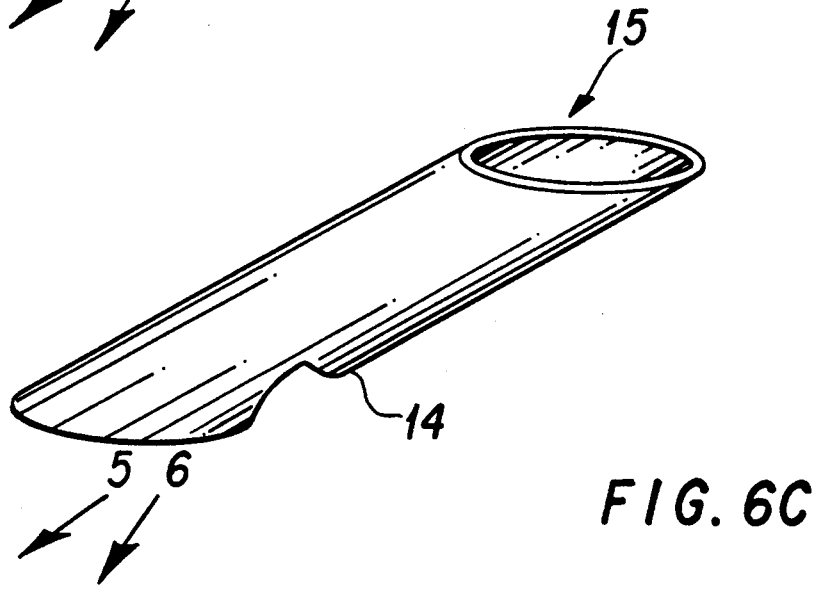

At the outlet, or terminal end, of the slide there can exist a terminus which sends the refuse on its particular trajectory. Preferred embodiments of the slide can be a straight slide with no lip 12, or a terminus best described as ski-jump like 13, or can be a hump 14; as seen in FIGS. 6A, 6B, and 6C respectively.

OPERATION OF INVENTION

The present invention aims at providing the user a simple, sanitary and convenient method to discard refuse and a means to reclaim the recyclable bottles and cans later in a separate receptacle.

Figure 5A:
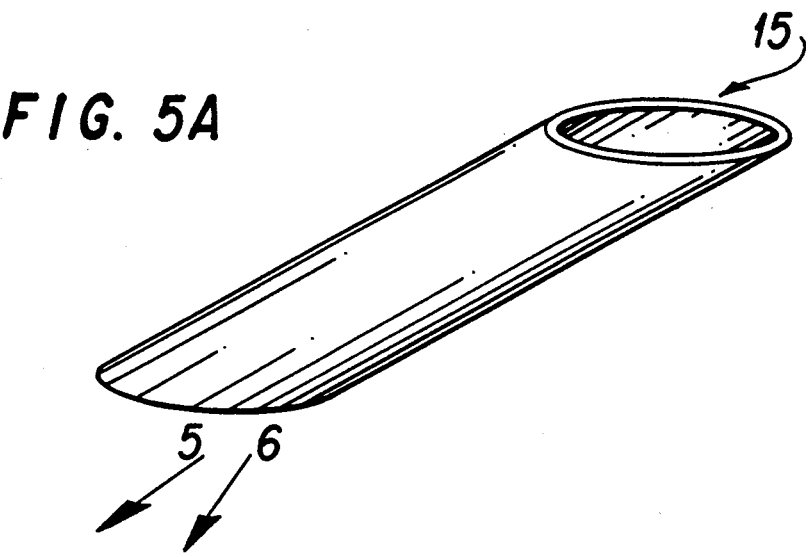
FIG. 5A shows trajectories of refuse falling through space before it enters the receptacles.
Figure 5B:
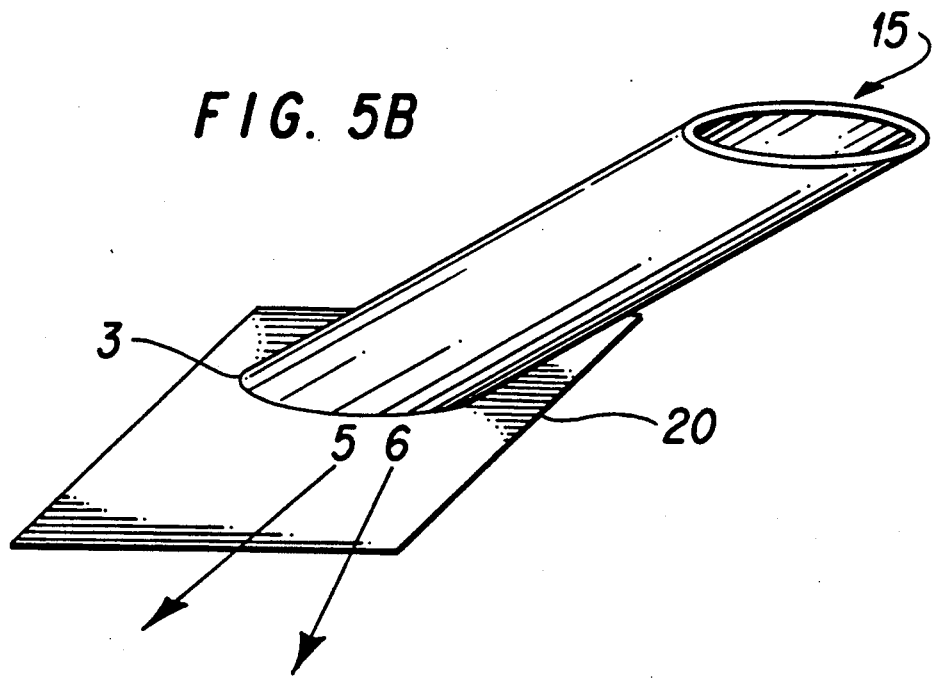
FIG. 5B shows trajectories of refuse falling along a skid-plate 20 and then falling through space before it enters the receptacles.

Once discarded into the inlet 1 of the slide paper, bottles, foodscraps, cans, plastic, foil, etc. travel down the slide. The refuse is separated because the size and weight of the bottles and cans is such that they attain a higher velocity while sliding down the slide than the other refuse. These faster moving bottles and cans are sent on a trajectory that lands them in a far receptacle 7, while the remainder of the refuse, which is slower moving, falls into the receptacle 8 closest to the outlet of the slide. In one preferred embodiment, as shown in FIGS. 1B and 5A, the refuse flies directly from the terminal end into the receptacles. In a different possible embodiment, as shown in FIG. 5B, after sliding down the slide, the refuse slides along a skid-plate 20 and then flies through the air and into the appropriate receptacle.

There can be three receptacles: the receptacle situated the farthest from the terminal end of the slide receives only bottles 17, the middle receptacle 18 only cans, and the closest only the non-recyclable refuse 19. Bottles, being heavier than cans, are jettisoned farther.

When the user decides to remove the separated refuse, he or she can take off the cover and carry the receptacle(s) to the curb-side for pickup or to the recycling center. In the possible embodiment of the receptacles being enclosed in a frame attached to the cover and slide. The receptacles can be withdrawn from the frame and carried away. If plastic liners have been used, these of course would be carried to the curb-side or recycling center.

CONCLUSION, RAMIFICATIONS, AND SCOPE OF INVENTION

While my descriptions contain many specificities, these should not be construed as limitations on the scope of the invention, but rather as an exemplification of one preferred embodiment thereof. Many other variations are possible.

Accordingly, the scope of the invention should be determined not by the embodiments illustrated, but by the appended claims and their legal equivalents.

Thus the reader will see that the trash separator provides a unique simple, sanitary, convenient and even profitable way to recycle. It can be used by people of all ages; can easily fit in the kitchen, garage, office or on a street corner; is made of molded plastic that is easy to clean and lightweight to carry.

What is claimed is:

1. An apparatus for segregating waste materials comprising:
   (a) at least two adjacently disposed receptacle means for receiving segregated waste materials;
   (b) a cover means disposed in overlying relationship to said at least two adjacently disposed receptacle means;
   (c) said cover means including an inlet opening for receiving waste materials and a downwardly inclined slide means for directing waste materials received through said inlet opening towards said at least two adjacently disposed receptacle means; and
   (d) said slide means including a terminal end located above said at least two adjacently disposed receptacle means whereby received waste materials are segregated into respective ones of said at least two adjacently disposed receptacle means due to the different trajectories attained at said slide means terminal end.

2. Apparatus as set forth in claim 1, further including: said slide means having an inclination between twenty and fifty degrees with respect to the horizontal.

3. Apparatus as set forth in claim 1, wherein: said slide means comprises a straight terminal end.

4. Apparatus as set forth in claim 1, wherein: said slide means comprises a ski-jump like terminal end.

5. Apparatus as set forth in claim 1, wherein: said slide means comprises a hump terminal end.

6. Apparatus as set forth in claim 1, wherein: said slide means comprises a curved trough.

7. Apparatus as set forth in claim 1, wherein: said slide means comprises a flat-bottomed trough.

8. Apparatus as set forth in claim 1, wherein: said waste materials include beverage cans and said slide means is formed with a trough whereby said beverage cans are allowed to slide down said trough.

9. A method for segregating waste materials comprising:
   (a) providing at least two adjacently disposed receptacle means for receiving segregated waste materials;
   (b) providing a cover means disposed in overlying relationship to said at least two adjacently disposed receptacle means, wherein: said cover means includes an inlet opening for receiving waste materials and a downwardly inclined slide means having a terminal end located above said at least two adjacently disposed receptacle means for directing waste materials received through said inlet opening towards said at least two adjacently disposed receptacle means; and
   (c) feeding waste materials into said inlet opening to segregate the received waste materials segregated into respective ones of said at least two adjacently disposed receptacle means due to the different trajectories attained at said slide means terminal end.

10. A method as set forth in claim 9 wherein: said slide means of said cover means has an inclination between twenty and fifty degrees with respect to the horizontal.

11. A method for segregating waste materials as set forth in claim 9 wherein: said waste materials to be segregated include beverage cans, said beverage cans attaining a greater trajectory to effect the segregation.

* * * * *